(12) United States Patent
Worley et al.

(10) Patent No.: US 10,841,275 B2
(45) Date of Patent: Nov. 17, 2020

(54) METHOD AND APPARATUS FOR REDUCING IP ADDRESSES USAGE OF NVME OVER FABRICS DEVICES

(71) Applicant: Samsung Electronics Co., Ltd., Suwon (KR)

(72) Inventors: Fred Worley, San Jose, CA (US); Sompong P. Olarig, Pleasanton, CA (US); Son T. Pham, San Ramon, CA (US)

(73) Assignee: Samsung Electronics Co., Ltd.

( * ) Notice: Subject to any disclaimer, the term of this patent is extended or adjusted under 35 U.S.C. 154(b) by 102 days.

(21) Appl. No.: 15/408,168

(22) Filed: Jan. 17, 2017

(65) Prior Publication Data
US 2018/0167352 A1  Jun. 14, 2018

Related U.S. Application Data

(60) Provisional application No. 62/433,065, filed on Dec. 12, 2016.

(51) Int. Cl.
H04L 29/12 (2006.01)
H04L 29/06 (2006.01)

(52) U.S. Cl.
CPC ...... H04L 61/2521 (2013.01); H04L 61/2514 (2013.01); H04L 61/2517 (2013.01); H04L 69/22 (2013.01)

(58) Field of Classification Search
CPC .......................... H04L 61/103; H04L 61/2521
See application file for complete search history.

(56) References Cited

U.S. PATENT DOCUMENTS

| 7,382,725 | B1 | 6/2008 | Kakadia |
| 7,783,822 | B2 | 8/2010 | Purcell et al. |
| 7,937,481 | B1 * | 5/2011 | Sandstrom ............ G06F 11/004 709/219 |
| 8,443,129 | B1 | 5/2013 | Murray et al. |
| 8,446,817 | B2 | 5/2013 | Stine et al. |

(Continued)

FOREIGN PATENT DOCUMENTS

WO  2015009939 A1  1/2015

OTHER PUBLICATIONS

Douglas Richard Hanks, Jr., "Juniper QFX5100 Series," 2015. (Year: 2015).*

(Continued)

Primary Examiner — Andrew C Georgandellis
(74) Attorney, Agent, or Firm — Innovation Counsel LLP

(57) ABSTRACT

A method includes: receiving a Transmission Control Protocol (TCP)/Internet Protocol (IP) packet from an initiator, wherein the TCP/IP packet includes an IP address of a switch and a port number; looking up an address translation table based on the IP address of the switch and the port number; translating the IP address of the switch to a private IP address based on the port number according to address mapping information stored in the address translation table; and routing the TCP/IP packet to a non-volatile memory express over fabrics (NVMeoF) device having the private IP address. A network address translation (NAT) router implemented in the switch is configured to perform the address translation from the IP address of the switch to the private IP address of the NVMeoF device.

20 Claims, 5 Drawing Sheets

(56) References Cited

U.S. PATENT DOCUMENTS

| | | | |
|---|---|---|---|
| 8,819,304 | B2 | 8/2014 | Shapiro et al. |
| 9,172,556 | B2 | 10/2015 | Del Signore et al. |
| 9,351,324 | B2 | 5/2016 | Krishna et al. |
| 9,450,870 | B2 | 9/2016 | Ananthapadmanabha et al. |
| 9,728,876 | B1* | 8/2017 | Shiue .................. H01R 12/725 |
| 2004/0143643 | A1* | 7/2004 | Takamoto ......... G06F 17/30067 |
| | | | 709/215 |
| 2005/0063398 | A1 | 3/2005 | Choudhury et al. |
| 2006/0250966 | A1* | 11/2006 | Su ....................... H04L 63/0876 |
| | | | 370/241 |
| 2014/0122727 | A1 | 5/2014 | Miner et al. |
| 2014/0188996 | A1 | 7/2014 | Lie et al. |
| 2016/0077976 | A1 | 3/2016 | Raikin et al. |

OTHER PUBLICATIONS

"Network Address Translation Catalyst Switch Support Matrix," Mar. 13, 2014. (Year: 2014).*

"Baseboard Management Controller (BMC)," Jan. 11, 2012. (Year: 2012).*

Mark Devonshire et al. "Allen-bradley stratix 5700: Network address translation (NAT)." Rockwell automation http://literature.rockwellautomation.com/idc/groups/literature/documents/wp/enet-wp032_-en-e.pdf.

* cited by examiner

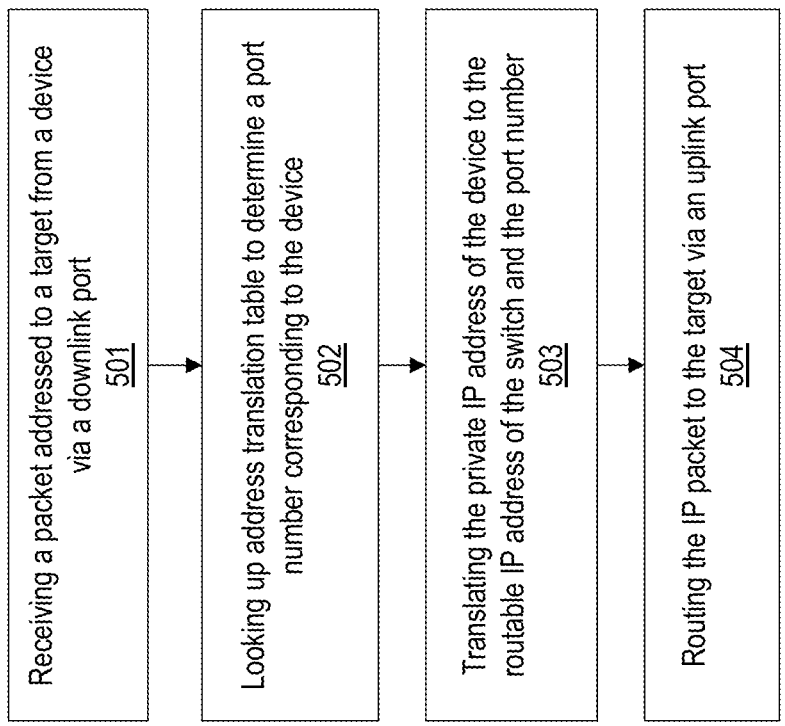

METHOD AND APPARATUS FOR REDUCING IP ADDRESSES USAGE OF NVME OVER FABRICS DEVICES

CROSS-REFERENCE TO RELATED APPLICATION(S)

This application claims the benefits of and priority to U.S. Provisional Patent Application Ser. No. 62/433,065 filed Dec. 12, 2016, the disclosure of which is incorporated herein by reference in its entirety.

TECHNICAL FIELD

The present disclosure relates generally to network switches, more particularly, to a system and method for reducing IP address usage of non-volatile memory express over fabrics (NVMeoF) devices.

BACKGROUND

Non-volatile memory express (NVMe) is a standard that defines a register-level interface for host software to communicate with a non-volatile memory subsystem (e.g., a solid-state drive (SSD)) over a peripheral component interconnect express (PCIe) bus. NVMe over fabrics (NVMeoF) or NVMf in short is an emerging standard that defines a common architecture that supports an NVMe block storage protocol over a wide range of storage networking fabrics such as Ethernet, Fibre Channel, InfiniBand, and other network fabrics. The term, fabric, represents a network topology in which network nodes can pass data to each other through a variety of interconnecting protocols, ports, and switches. For example, Ethernet-attached SSDs may attach directly to a fabric, and in this case the fabric is the Ethernet.

An NVMeoF device is capable of moving data to and from an initiator (e.g., host software) by itself over the fabric using its IP address that is uniquely identifiable in an NVMeoF-based system. In cases where several NVMeoF devices (or targets) are attached to a server or a switch, a number of IP addresses can be consumed by the attached NVMeoF devices. This can be an issue for enterprise customers and cloud service providers who may have a limited number of IP addresses available for servicing customers and service subscribers. With the popularity of NVMeoF-compatible devices, more IP addresses will be needed in the future, particularly for an NVMeoF system that supports the IPv4 addressing scheme.

Various techniques can be utilized to conserve the IP address usage for the numerous NVMeoF devices. Examples of such techniques include network address translation (NAT) and use of a firewall. NAT is a technique for remapping one IP address space to another IP address space by modifying network address information in headers of Transmission Control Protocol (TCP)/Internet Protocol (IP) datagram packets while the TCP/IP packets are in transit across a traffic routing device. NAT-enabled routers are widely used to conserve global address space allocations in the face of IPv4 address exhaustion by sharing one Internet-routable IP address of a NAT-gateway for an entire private network.

FIG. 1 shows a prior art address mapping technique including a NAT-enabled router. Initiators 101A and 101B are coupled to an NVMeoF rack system 150 in a private network. The NVMeoF rack system 150 includes an NAT router 111, a top-of-rack (TOR) switch 112, and NVMeoF servers 130A and 130B. Each of the NVMeoF servers can include a network interface card (NIC) 131 and a solid-state drive (SSD) 132. In the present example, the NAT router 111 has an IP address 40.40.40.40. The initiators 101A and 101B can send TCP/IP packets to the NAT router 111 using different ports available on the NAT router 111. The TOR switch 112 has uplink ports that connect to the external NAT router 111 and downlink ports that connect to the respective NVMeoF servers 130A and 130B. The number of the uplink ports and the number of the downlink ports may be different from each other. For example, the number of the uplink ports may correspond to the number of ports available on the NAT router 111 whereas the number of the downlink ports may correspond to the number of NVMeoF servers 130 attached to the NVMeoF rack system 150.

The NAT router 111 receives TCP/IP packets addressed to different ports of the NAT router 111 and redirects the received TCP/IP packets to the TOR switch 112. The NAT router 111 replaces the NAT router address (e.g., 40.40.40.40:1) in the TCP/IP packet's destination address with a corresponding internal IP address (e.g., 20.20.20.1) of the destination NVMeoF SSD (e.g., 132A) based on the address translation table. In this case, the TOR switch 112 simply forwards the TCP/IP packet to the destination NVMeoF server (e.g., NVMeoF server 130A) without performing further address translation. Each of the NVMeoF devices has uniquely identifiable IP addresses that are internal to the NVMeoF rack system 150 but are not addressable or routable of the initiators 101A and 101B.

However, this router-based address translation scheme using an external NAT router as shown in FIG. 1 can add an additional cost due to the requirement of the NAT router. Further, the external NAT router can consume a valuable rack space of the switch that is already occupied by the internal switching components and hardware.

SUMMARY

According to one embodiment, a method includes: receiving an Transmission Control Protocol (TCP)/Internet Protocol (IP) packet from an initiator, wherein the TCP/IP packet includes an IP address of a switch appended with a port number; looking up an address translation table based on the IP address of the switch and the port number; translating the IP address of the switch to a private IP address based on the port number according to address mapping information stored in the address translation table; and routing the TCP/IP packet to a non-volatile memory express over fabrics (NVMeoF) device having the private IP address. A network address translation (NAT) router implemented in the switch is configured to perform the address translation from the IP address of the switch to the private IP address of the NVMeoF device.

According to another embodiment, a method includes: receiving a Transmission Control Protocol (TCP)/Internet Protocol (IP) packet addressed to an initiator from an NVMeoF device attached to a switch; determining an IP address of the initiator based on the TCP/IP packet and a port number corresponding to the NVMeoF device by referring to an address translation table; translating a private IP address of the NVMeoF device to a routable IP address of the switch and the port number of the NVMeoF device; and routing the TCP/IP packet to the initiator from the switch based on the routable IP address. A network address translation (NAT) router implemented in the switch is configured to perform the address translation from the private IP address of the NVMeoF device to the routable IP address of the switch and the port number corresponding to the NVMeoF device.

According to yet another embodiment, a system includes: a plurality of uplink ports configured to establish connection with a plurality of initiators; a plurality of downlink ports configured to establish connection with a plurality of NVMeoF devices attached to the switch; and a NAT router integrated in the switch as a software or a firmware. The NAT router receives a Transmission Control Protocol (TCP)/Internet Protocol (IP) packet addressed to the switch on a port number from an initiator, translates an IP address of the switch to a private IP address of a destination NVMeoF device based on the port number according to address mapping information stored in an address translation table, and routes the TCP/IP packet to the destination NVMeoF device.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

FIG. 5 is a flowchart of an example process for network address translation for a TCP/IP packet, according to another embodiment.

Figure 1:
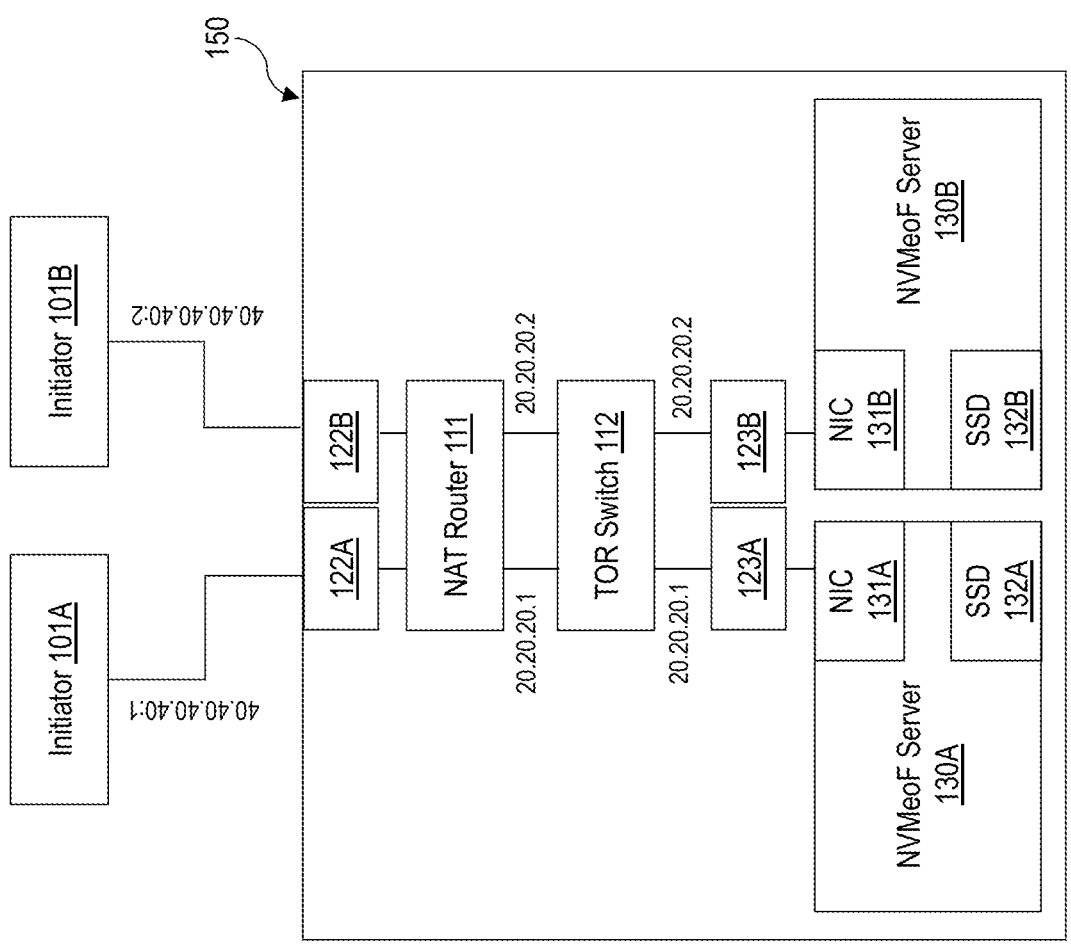
FIG. 1 shows a prior art address mapping technique including a NAT-enabled router.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to provide a system and method for network address translation using a NAT router that is integrated in an NVMeoF-based switch or server. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure provides a system and method for providing a network address translation (NAT) scheme using a NAT router that is integrated in an NVMeoF-based switch or server. The present NAT router can be software-based or firmware-based instead of being a physical NAT router that is externally coupled to the NVMeoF switch such as the NAT router 111 shown in FIG. 1. The present NAT router can cost-effectively reduce the number of IP addresses for NVMeoF devices that are attached to the NVMeoF-based switch while reducing the consumption of the rack space and power usage. Further, the present NAT router allows a user to enable or disable the NAT features dynamically without rebooting the system.

The Open Systems Interconnection (OSI) model characterizes and standardizes the communication functions of a telecommunication or computing system independent of their underlying internal structure and technology. Traditional packet switching operates at layer 2 (e.g., data link layer) of the OSI model, where packets are sent to a specific switch port based on destination addresses. Routing operates at layer 3 (e.g., network layer), where packets are sent to a specific next-hop IP address, based on the destination IP address.

According to some embodiments, an NVMeoF-based switch can include two Ethernet switches, namely, layer-2 and layer-3 switches. The layer 2 switch can be used primary for the downlink ports and communicates with the layer-3 switch, and the layer 3 switch can be used primary for the uplink ports and used as an NAT router. The layer-2 switch and the layer-3 switch may have a small number of port counts, therefore the NVMeoF-based switch including the layer-2 and layer-3 switches can add only an incremental cost to the system for address translation. In comparison, a single switch having a large number of port counts would be costlier compared to the two-switch system.

Figure 2:
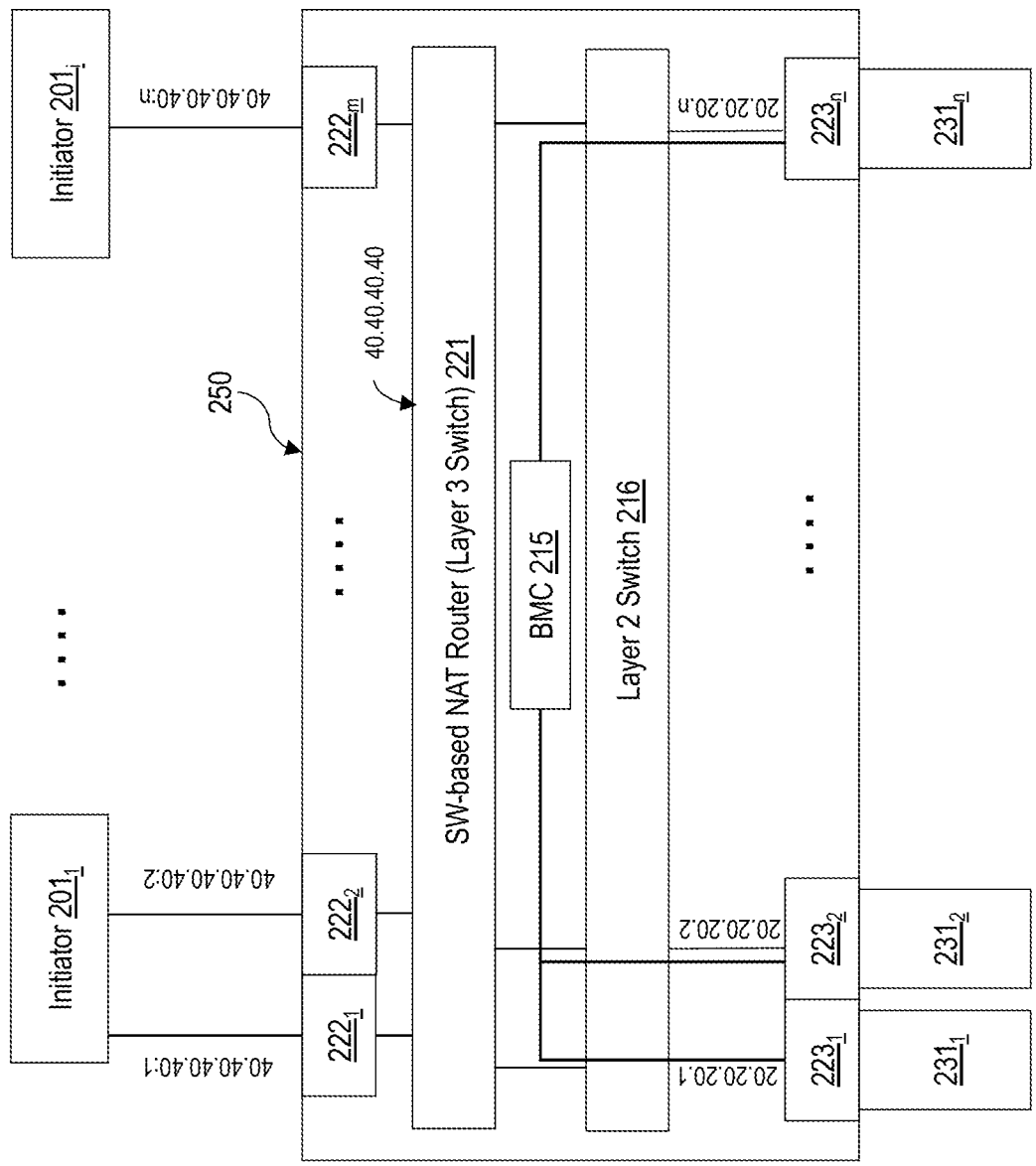
FIG. 2 shows an example NVMeoF-based switch including a software-based NAT router, according to one embodiment.

FIG. 2 shows an example NVMeoF-based switch including a software-based NAT router, according to one embodiment. The NVMeoF-based switch 250 includes a software-based (or firmware-based) NAT router 221 and a layer-2 switch 216. According to one embodiment, the NAT router 221 can be implemented in a layer-3 switch of the NVMeoF-based switch 250. The layer-2 switch 216 can be used for downlink ports, and the layer-3 switch can be used for uplink ports of the NVMeoF-based switch 250. A number of NVMeoF devices 231 can be plugged into the device ports of the NVMeoF-based switch 250. For example, each of the NVMeoF devices 231 is connected to the NVMeoF-based switch 250 using a U.2 connector.

The NAT router 221 can reduce the usage of IP addresses for the active NVMeoF devices 231 that are attached to the NVMeoF-based switch 250. To reduce the number of IP addresses used in the public network (e.g., Internet) or an enterprise network, the NAT router 221 can map multiple private IP addresses to a single public address that is assigned to the NVMeoF-based switch 250.

The mapping of multiple private IP addresses to a single public address or vice versa is referred to as Port Address Translation (PAT). The NAT router 221 implemented in the NVMeoF-based switch 250 is configured to translate IP addresses between the private IP addresses of the attached NVMeoF devices 231 and the single public IP address of the NVMeoF-based switch 250.

TCP/IP packets include an IP address of a switch and a port number including two-layered packet headers, namely, a TCP packet header and a IP packet header. The higher layer TCP packet header has fields of a source port and a destination port, and the lower layer IP packet header has fields of a source address and a destination address. TCP/IP packets generated by one or more initiators $201_1$ through $201_i$ can be addressed to the publicly routable IP address of the NVMeoF-based switch 250. For example, the NVMeoF-based switch 250 is assigned with the publicly routable IP address 40.40.40.40. The TCP/IP packets addressed to the IP address 40.40.40.40 are received by the respective uplink ports 222 based on the destination port numbers 1-n as designated in each of the TCP/IP packets. The number of the uplink ports 222 may correspond to the number of available uplink ports on the NVMeoF-based switch 250 that are addressable by the initiators $201_1$ through $201_i$. The NAT router 221 receives the TCP/IP packets via the uplink ports 222. In conjunction with the layer-2 switch 216, the NAT router 221 translates the publicly routable IP address of the NAT router 221 to the corresponding private IP addresses that are privately routable within the NVMeoF-based switch 250.

The TCP/IP packets are internally routed from the NAT router 221 to the downlink ports 223 via the layer-2 switch 216. Each of the attached NVMeoF devices 231 has a uniquely identifiable private IP address. In the present example, the NVMeoF devices $231_1$ through $231_n$ are addressable using their respective private IP addresses 20.20.20.1 through 20.20.20.n. The NVMeoF-based switch 250 performs the address translation for the TCP/IP packets received from the initiators $201_1$ through $201_i$ and routes the TCP/IP packets to the destination NVMeoF devices 231 based on the address translation between the public IP address of the NVMeoF-based switch 250 and the destination port numbers contained in the TCP/IP packets.

The NVMeoF devices 231 can be removably attached to the chassis of the NVMeoF-based switch 250. The number of the uplink ports 222 and the number of the downlink ports 223 may be different from each other. For example, the number of the downlink ports 223 may correspond to the number of NVMeoF devices 231.

The NVMeoF devices 231 are attached to the NVMeoF-based switch 250 in the private network. The private IP addresses (e.g., 20.20.20.1 through 20.20.20.n) of the attached NVMeoF devices 231 are neither visible nor addressable to the external initiators $201_1$ through $201_i$ that are on a public network (e.g., Internet) or an enterprise network outside the private network. The NAT router 221 can look up an address translation table that stores the device address information and downlink and uplink port information for routing TCP/IP packets between the private IP addresses of the attached NVMeoF devices 231 and the public IP address of the NVMeoF-based switch 250. The NAT router 221 checks the address translation table and determines the destination NVMeoF device 231 on the private network that the TCP/IP packet is addressed to. The NAT router 221 changes the destination IP address and the destination port number of the TCP/IP packets to the mapped IP address of the destination NVMeoF device 231 as saved in the address translation table and routes the TCP/IP packet to the destination NVMeoF device 231. The TCP/IP packet is finally delivered to the destination NVMeoF device 231 via the layer-2 switch 216 and the corresponding downlink port 223.

Similarly, an NVMeoF device 231 on the private network can send an TCP/IP packet to an initiator 201 outside the private network. In this case, the NVMeoF device 231 can be an initiator, and the initiator 201 can be a target. The NAT router 221 receives the TCP/IP packet from the NVMeoF device 231 on the private network. The NAT router 221 replaces the non-routable private IP address of the NVMeoF device 231 with the routable IP address (e.g., 40.40.40.40) of the NVMeoF-based switch 250 by replacing the source port of the NVMeoF device 231 with a port number corresponding to the designated port of the routable IP address based on the device address information and the port information stored in the address translation table. The initiator 201 receives the TCP/IP packet from the NAT router 221 on the designated port. These processes can repeat between any initiator 201 to communicate with any NVMeoF device 231. Because the NVMeoF-based switch 250 includes the layer-3 switch that can support network address translation, an external NAT router such as the NAT router 111 of FIG. 1 can be eliminated.

According to one embodiment, the software-based NAT router 221 can be implemented in a layer-3 switch that has a unique routable IP address with a first number of port counts. The layer-3 switch may be an adequate choice for implementing the software-based NAT router 221 because running Ethernet at 25G or greater may require another chip to improve the signal integrity. According to one embodiment, the NVMeoF-based switch 250 can use a layer-2 switch that is cheaper but has a larger number of ports compared to the number of ports available for the layer-3 switch. The larger number of ports of the layer-2 can supports many NVMeoF devices 231 that can be attached to the NVMeoF switch 250 for expanding the storage space in a system such as a cloud server or a database.

Although the present example describes the switch 250 that is compatible with NVMeoF, the switch 250 can be a dual-purpose switch that can support both NVMe and NVMeoF standards. According to one embodiment, a baseboard management controller (BMC) 215 of the switch 250 can dynamically configure the NAT router 221 to perform address translation to only a subset of ports that are occupied by the active NVMeoF devices 231. In some cases, the BMC 215 can dynamically configure the NAT router 221 to disable the selected ports assigned to the NVMe devices 231. For example, the BMC can detect the presence of a particular NVMeoF device 231 and disable a downlink port corresponding to the NVMeoF device 231 based on the presence of the NVMeoF device. The BMC can update the address translation table if necessary to allow the NAT router 221 to determine whether the NVMeoF device 231 is plugged in or not.

Figure 3:
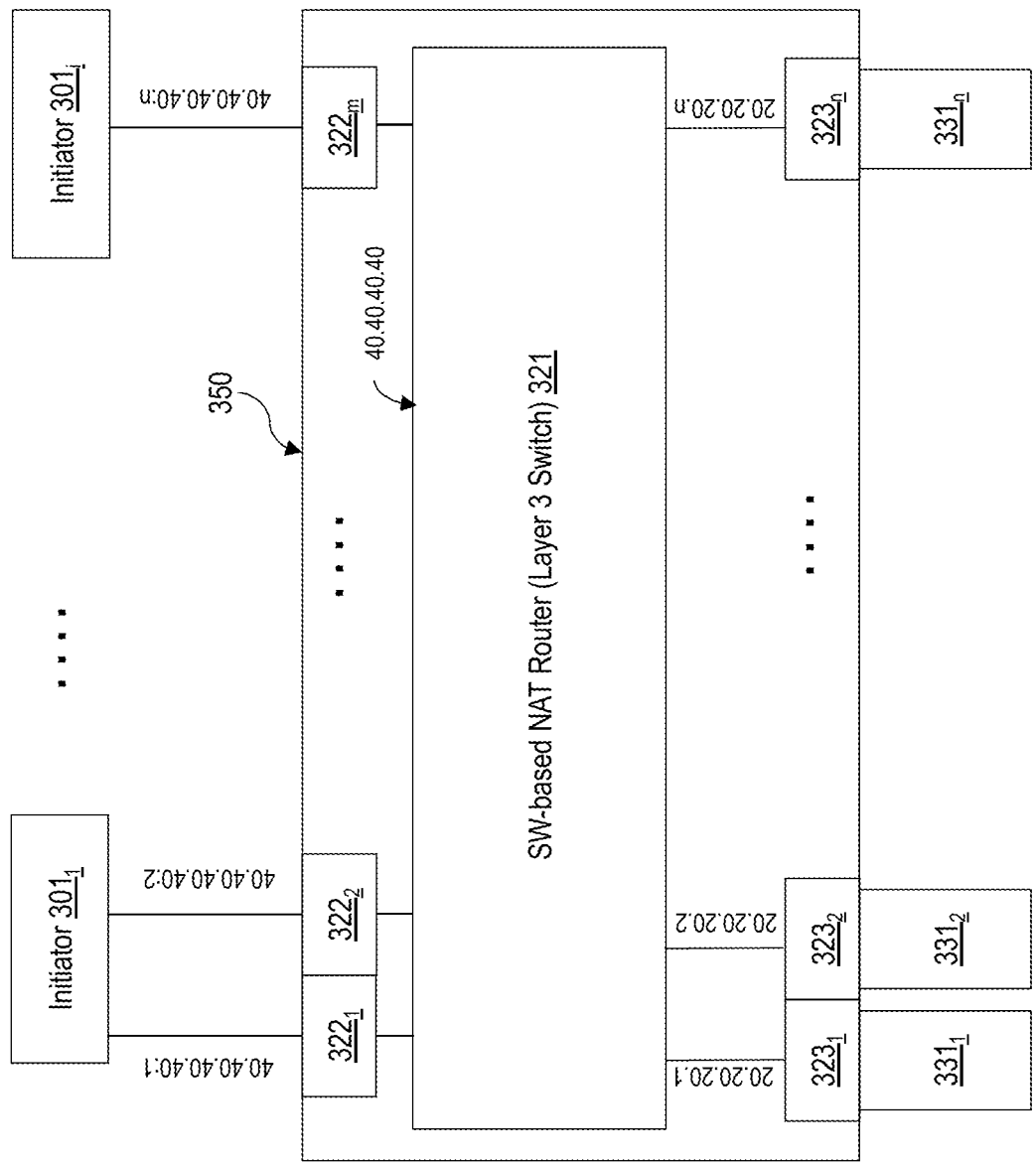
FIG. 3 shows an example NVMeoF-based switch including a software-based NAT router, according to another embodiment.

According to another embodiment, an NVMeoF-based switch can include only a layer-3 switch. The layer-3 switch can be used for the downlink ports as well as for the uplink ports. FIG. 3 shows an example NVMeoF-based switch including a software-based NAT router, according to another embodiment. The NVMeoF-based switch 350 includes a software-based (or firmware-based) NAT router 321. According to one embodiment, the NAT router 321 can be implemented in a layer-3 switch of the NVMeoF-based switch 350. The layer-3 switch is used for downlink ports as well as uplink ports of the NVMeoF-based switch 350. A number of NVMeoF devices 331 can be plugged into device ports of the NVMeoF-based switch 350. For example, each of the NVMeoF devices 331 is connected to the NVMeoF-based switch 350 using a U.2 connector.

The NAT router 321 can reduce the usage of IP addresses for the active NVMeoF devices 331 attached to the NVMeoF-based switch 350. To reduce the number of IP addresses used in the public network or an enterprise network, the NAT router 321 can map multiple private IP addresses to a single public address of the NVMeoF-based switch 350. The NAT router 321 implemented in the NVMeoF-based switch 350 is configured to translate IP addresses between the private IP addresses of the attached NVMeoF devices 331 and the single public IP address of the NVMeoF-based switch 350.

One or more initiators $301_1$ through $301_i$ can send TCP/IP packets to the NVMeoF-based switch 350 based on the publicly routable IP address of the NVMeoF-based switch 350. For example, the NAT router 321 of the NVMeoF-based switch 350 can be assigned with the publicly routable IP address 40.40.40.40. The packets addressed to the IP address 40.40.40.40 are routed to the respective uplink ports 322 based on the destination port numbers 1-n. The number of the uplink ports 322 may correspond to the number of available ports on the NVMeoF-based switch 350 that are addressable by the initiators $301_1$ through $301_i$. The NAT router 321 receives the TCP/IP packets via the uplink ports 322. The NAT router 321 translates the publicly routable IP address of the NAT router 321 to the corresponding private IP addresses that are internally routable within the NVMeoF-based switch 350.

The TCP/IP packets are internally routed from the NAT router 321 to the downlink ports 323. Each of the attached NVMeoF devices 331 has a uniquely identifiable private IP address. In the present example, the NVMeoF devices $331_1$ through $331_n$ are addressable using the respective private IP addresses 20.20.20.1 through 20.20.20.n. The NVMeoF-based switch 350 performs the address translation for the TCP/IP packets received from the initiators $301_1$ through $301_i$ and routes the TCP/IP packets to the destination NVMeoF devices 331 using the IP address of the NAT router 311 and the destination port numbers of the TCP/IP packets.

The NVMeoF devices 331 can be removably attached to the chassis of the NVMeoF-based switch 350. The number of the uplink ports 322 and the number of the downlink ports 323 may be different from each other. For example, the number of the downlink ports 323 may correspond to the number of NVMeoF devices 331.

The NVMeoF devices 331 are attached to the NVMeoF-based switch 350 in the private network. The private IP addresses (e.g., 20.20.20.1 through 20.20.20.n) of the attached NVMeoF devices 331 are neither visible nor addressable to the external initiators $301_1$ through $301_i$ that are on a public network (e.g., Internet) or an enterprise network outside the private network. The NAT router 321 can look up an address translation table that stores the device address information and downlink and uplink port information for routing TCP/IP packets between the private IP addresses of the attached NVMeoF devices 331 and the public IP address of the NVMeoF-based switch 350. The NAT router 321 checks the address translation table and determines the destination NVMeoF device 331 on the private network that the TCP/IP packet is addressed to. The NAT router 321 changes the destination IP address and the destination port number of the TCP/IP packets to the mapped IP address of the destination NVMeoF device 331 as saved in the address translation table and routes the TCP/IP packet to the destination NVMeoF device 331. The TCP/IP packet is finally delivered to the destination NVMeoF device 331 via the corresponding downlink port 323.

Similarly, an NVMeoF device 331 on the private network can send an TCP/IP packet to an initiator 301 outside the private network. In this case, the NVMeoF device 331 can be an initiator, and the initiator 301 can be a target. The NAT router 321 receives the TCP/IP packet from the NVMeoF device 331 on the private network. The NAT router 321 replaces the non-routable private IP address of the NVMeoF device 331 with the routable IP address (e.g., 40.40.40.40) of the NVMeoF-based switch 350 by replacing the source port of the NVMeoF device 331 with a port number corresponding to the designated port of the routable IP address based on the device address information and the port information stored in the address translation table. The initiator 301 receives the TCP/IP packet from the NAT router 321 on the designated port. These processes can repeat between any initiator 301 to communicate with any NVMeoF device 331. Because the NVMeoF-based switch 350 includes the layer-3 switch that can support network address translation, an external NAT router such as the NAT router 111 of FIG. 1 can be eliminated.

Figure 4:
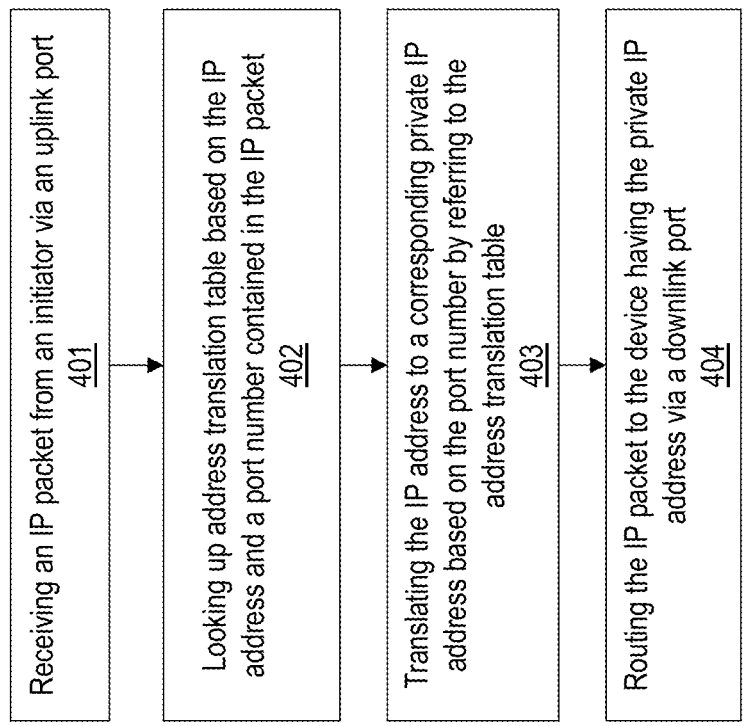
FIG. 4 is a flowchart of an example process for network address translation for a TCP/IP packet, according to one embodiment.

FIG. 4 is a flowchart of an example process for network address translation for a TCP/IP packet, according to one embodiment. An NVMeoF-based switch receives a TCP/IP packet addressed to a destination NVMeoF device from an initiator via an uplink port of the NVMeoF-based switch (401). The NVMeoF-based switch can have an address translation table storing the device address information and the port information for network address translation. The NVMeoF-based switch looks up the address translation table based on the IP address and the port number contained in the header of the TCP/IP packet (402). The NAT router implemented in the NVMeoF-based switch translates the IP address to a matching private IP address based on the port number by referring the address translation table (403). The NVMeoF-based switch routes the TCP/IP packets to the device that has the private IP address via a downlink port of the NVMeoF-based switch (404).

FIG. 5 is a flowchart of an example process for network address translation for a TCP/IP packet, according to another embodiment. An NVMeoF-based switch receives a TCP/IP packet addressed to a target from an NVMeoF device via a downlink port of the NVMeoF-based switch (501). The NVMeoF-based switch can have an address translation table storing the device address information and the port information for network address translation. The NVMeoF-based switch looks up the address translation table to determine a port number corresponding to the device (502). The NAT router implemented in the NVMeoF-based switch translates the private IP address of the device to a matching routable IP address of the switch and the port number corresponding to the device as identified in the address translation table (503). The NVMeoF-based switch routes the TCP/IP packets to the target that has the routable IP address and the port number associated with the device via a downlink port of the NVMeoF-based switch (504).

A method includes: receiving a Transmission Control Protocol (TCP)/Internet Protocol (IP) packet from an initiator, wherein the TCP/IP packet includes an IP address of a switch and a port number; looking up an address translation table based on the IP address of the switch and the port number; translating the IP address of the switch to a private IP address based on the port number according to address mapping information stored in the address translation table; and routing the TCP/IP packet to a non-volatile memory express over fabrics (NVMeoF) device having the private IP address. A network address translation (NAT) router implemented in the switch is configured to perform the address translation from the IP address of the switch to the private IP address of the NVMeoF device.

The switch may include a layer-3 switch, and the NAT router may be implemented in the layer-3 switch.

The NAT router may be implemented as software or firmware of the layer-3 switch.

The switch may include a layer-2 switch. The layer-3 switch may be connected to a plurality of uplink ports, and the layer-2 switch may be connected to a plurality of downlink ports.

The packet may be routed to the NVMeoF device via a corresponding downlink port assigned to the NVMeoF device.

A plurality of NVMeoF devices may be connected to the switch via a respective downlink port.

The NVMeoF device may is assigned with a unique private IP address in a private network that is internal to the switch.

The switch may further include a baseboard management controller (BMC) that is capable of dynamically configuring the NAT router to perform address translation to only a subset of downlink ports that are occupied by a plurality of NVMeoF devices.

The BMC may be further configured to selectively disable one or more of the downlink ports.

The BMC may be further configured to detect a presence of the NVMeoF device and disable a downlink port corresponding to the NVMeoF device based on the presence of the NVMeoF device.

The method may further include updating the address translation table based on the presence of the NVMeoF device.

A method includes: receiving a Transmission Control Protocol (TCP)/Internet Protocol (IP) packet addressed to an initiator from an NVMeoF device attached to a switch; determining an IP address of the initiator based on the TCP/IP packet and a port number corresponding to the NVMeoF device by referring to an address translation table; translating a private IP address of the NVMeoF device to a routable IP address of the switch and the port number of the NVMeoF device; and routing the TCP/IP packet to the initiator from the switch based on the routable IP address. A network address translation (NAT) router implemented in the switch is configured to perform the address translation from the private IP address of the NVMeoF device to the routable IP address of the switch and the port number corresponding to the NVMeoF device.

The switch may include a layer-3 switch, and the NAT router may be implemented in the layer-3 switch.

The NAT router may be implemented as software or firmware of the layer-3 switch.

The switch may include a layer-2 switch. The layer-3 switch may be connected to a plurality of uplink ports, and the layer-2 switch may be connected to a plurality of downlink ports.

The packet may be routed to the initiator via a corresponding uplink port established between the NAT router and the initiator.

A plurality of NVMeoF devices may be connected to the switch via a respective downlink port.

The NVMeoF device may be assigned with a unique private IP address in a private network that internal to the switch.

A switch includes: a plurality of uplink ports configured to establish connection with a plurality of initiators; a plurality of downlink ports configured to establish connection with a plurality of NVMeoF devices attached to the switch; and a NAT router integrated in the switch as a software or a firmware. The NAT router receives a Transmission Control Protocol (TCP)/Internet Protocol (IP) packet addressed to the switch on a port number from an initiator, translates an IP address of the switch to a private IP address of a destination NVMeoF device based on the port number according to address mapping information stored in an address translation table, and routes the TCP/IP packet to the destination NVMeoF device.

The switch may further include a layer-3 switch, and the NAT router is implemented in the layer-3 switch.

The destination NVMeoF device may be assigned with a unique private IP address in a private network that is internal to the switch.

The switch may further a baseboard management controller (BMC) that is capable of dynamically configuring the NAT router to perform address translation to only a subset of downlink ports that are occupied by a plurality of NVMeoF devices.

The BMC may be further configured to detect a presence of the NVMeoF device and disable a downlink port corresponding to the NVMeoF device based on the presence of the NVMeoF device.

The BMC may be further configured to update the address translation table based on the presence of the NVMeoF device.

The above example embodiments have been described hereinabove to illustrate various embodiments of implementing a system and method for providing a system and method for network address translation using a NAT router that is integrated in an NVMeoF-based switch or server. Various modifications and departures from the disclosed example embodiments will occur to those having ordinary skill in the art. The subject matter that is intended to be within the scope of the invention is set forth in the following claims.

What is claimed is:

1. A method comprising:
   receiving a Transmission Control Protocol (TCP)/Internet Protocol (IP) packet from an initiator, wherein the TCP/IP packet includes an IP address of a switch and a port number;
   looking up an address translation table based on the IP address of the switch and the port number;
   translating, using a network address translation (NAT) router implemented in the switch, the IP address of the switch to a private IP address based on the port number according to address mapping information stored in the address translation table;
   detecting, using a baseboard management controller (BMC) implemented in the switch, a presence of a destination non-volatile memory express over fabrics (NVMeoF) device that is removably plugged into a device port connector of the switch; and
   routing the TCP/IP packet to the destination NVMeoF device using the private IP address;
   disabling, using the BMC, a downlink port corresponding to the destination NVMeoF device in response to detecting that the destination NVMeoF device is unplugged from the device port connector; and
   updating, using the BMC, the address translation table based on the presence of the destination NVMeoF device,
   wherein the private IP address of the destination NVMeoF device is dynamically assigned based on the port number associated with the device port connector into which the destination NVMeoF device is plugged.

2. The method of claim 1, wherein the switch includes a layer-3 switch, and the NAT router is implemented in the layer-3 switch.

3. The method of claim 2, wherein the NAT router is implemented as software or firmware of the layer-3 switch.

4. The method of claim 2, wherein the switch includes a layer-2 switch, the layer-3 switch is connected to a plurality of uplink ports, and the layer-2 switch is connected to a plurality of downlink ports.

5. The method of claim 4, wherein the TCP/IP packet is routed to the destination NVMeoF device via the downlink port that is assigned to the NVMeoF device among the plurality of downlink ports.

6. The method of claim 1, wherein the switch includes a plurality of device port connectors and a plurality of downlink ports, and each of a plurality of NVMeoF devices is removably plugged into a respective device port connector of the plurality of device port connectors via a respective downlink port among the plurality of downlink ports.

7. The method of claim 1, wherein the destination NVMeoF device is assigned with a unique private IP address in a private network that is internal to the switch irrespective of the device port connector to which the destination NVMeoF device is plugged into among a plurality of device port connectors of the switch.

8. The method of claim 1, wherein the BMC is further configured to selectively disable one or more of the plurality of downlink ports.

9. The method of claim 1, wherein the device port connector is a U.2 connector.

10. A method comprising:
    receiving a Transmission Control Protocol (TCP)/Internet Protocol (IP) packet addressed to an initiator from source non-volatile memory express over fabrics (NVMeoF) device that is removably plugged into a device port connector of a switch;
    determining an IP address of the initiator based on the TCP/IP packet and a port number corresponding to the source NVMeoF device by referring to an address translation table;
    translating, using a network address translation (NAT) router implemented in the switch, a private IP address of the source NVMeoF device to a routable IP address of the switch and the port number corresponding to the source NVMeoF device;
    detecting, using a baseboard management controller (BMC) implemented in the switch, a presence of the source NVMeoF device via the device port connector;
    routing the TCP/IP packet to the IP address of the initiator from the switch based on the routable IP address;
    disabling, using the BMC, a downlink port corresponding to the source NVMeoF device in response to detecting that the source NVMeoF device is unplugged from the device port connector; and
    updating, using the BMC, the address translation table based on the presence of the source NVMeoF device,
    wherein the private IP address of the source NVMeoF device is dynamically assigned based on the port number associated with the device port connector into which the source NVMeoF device is plugged.

11. The method of claim 10, wherein the switch includes a layer-3 switch, and the NAT router is implemented in the layer-3 switch.

12. The method of claim 11, wherein the NAT router is implemented as software or firmware of the layer-3 switch.

13. The method of claim 11, wherein the switch includes a layer-2 switch, the layer-3 switch is connected to a plurality of uplink ports, and the layer-2 switch is connected to a plurality of downlink ports.

14. The method of claim 13, wherein the TCP/IP packet is routed to the initiator via a corresponding uplink port established between the NAT router and the initiator among a plurality of uplink ports.

15. The method of claim 10, wherein the switch includes a plurality of device port connectors and a plurality of downlink ports, and each of a plurality of NVMeoF devices is removably plugged into a respective device port connector of the plurality of device port connectors via a respective downlink port among the plurality of downlink ports.

16. The method of claim 10, wherein the source NVMeoF device is assigned with a unique private IP address in a private network that internal to the switch irrespective of the device port connector to which the source NVMeoF device is plugged into among a plurality of device port connectors of the switch.

17. A switch comprising:
a plurality of uplink ports configured to establish connection with a plurality of initiators;
a plurality of downlink ports configured to establish connection with a plurality of NVMeoF devices attached to the switch;
a plurality of device port connectors configured to removably attach the plurality of NVMeoF devices;
a baseboard management controller (BMC); and
a NAT router integrated in the switch,
wherein the NAT router is configured to receive a Transmission Control Protocol (TCP)/Internet Protocol (IP) packet addressed to the switch on a port number from an initiator, translate an IP address of the switch to a private IP address of a destination NVMeoF device based on the port number according to address mapping information stored in an address translation table, and route the TCP/IP packet to the destination NVMeoF device,
wherein the destination NVMeoF device is removably plugged into a device port connector of the switch among the plurality of device port connectors,
wherein the BMC is configured to detect a presence of the destination NVMeoF device via the device port connector and disable a downlink port corresponding to the destination NVMeoF device in response to detecting that the destination NVMeoF device is unplugged from the device port connector, and
wherein the BMC is further configured to update the address translation table based on the presence of the destination NVMeoF device, and
wherein the private IP address of the destination NVMeoF device is dynamically assigned based on the port number associated with the device port connector into which the destination NVMeoF device is plugged.

18. The switch of claim 17 further comprising a layer-3 switch, wherein the NAT router is implemented in the layer-3 switch.

19. The switch of claim 17, wherein the destination NVMeoF device is assigned with a unique private IP address in a private network that is internal to the switch irrespective of the device port connector to which the destination NVMeoF device is plugged into among the plurality of device port connectors.

20. The switch of claim 17, wherein the device port connector is a U.2 connector.

* * * * *